(12) United States Patent
Pan et al.

(10) Patent No.: US 11,501,070 B2
(45) Date of Patent: Nov. 15, 2022

(54) TAXONOMY GENERATION TO INSERT OUT OF VOCABULARY TERMS AND HYPERNYM-HYPONYM PAIR INDUCTION

(71) Applicant: INTERNATIONAL BUSINESS MACHINES CORPORATION, Armonk, NY (US)

(72) Inventors: Feifei Pan, Troy, NY (US); Md Faisal Mahbub Chowdhury, Woodside, NY (US); Alfio Massimiliano Gliozzo, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 16/918,018

(22) Filed: Jul. 1, 2020

(65) Prior Publication Data

US 2022/0004711 A1    Jan. 6, 2022

(51) Int. Cl.
*G06F 40/237*    (2020.01)
*G06F 16/36*    (2019.01)
(Continued)

(52) U.S. Cl.
CPC ........ *G06F 40/279* (2020.01); *G06F 16/3344* (2019.01); *G06F 40/30* (2020.01); *G06N 20/00* (2019.01)

(58) Field of Classification Search
CPC ...... G06F 16/36; G06F 16/367; G06F 40/237; G06F 40/274; G06F 40/247; G06F 40/30; G06N 20/00
(Continued)

(56) References Cited

U.S. PATENT DOCUMENTS 9,378,277 B1 *    6/2016  Nguyen ............ G06F 16/90335
2003/0120662 A1 *    6/2003  Vishik .................... G06F 16/367
(Continued)

FOREIGN PATENT DOCUMENTS

CN    103778238 B    3/2015
CN    105787105 B    7/2016
(Continued)

OTHER PUBLICATIONS

Chang, et al., "Distributional Inclusion Vector Embedding For Unsupervised Hypernymy Detection," NAACL 2018, May 29, 2018, 20 pages, arXiv:1710.00880, Retreived from the Internet: <URL: https://arxiv.org/abs/1710.00880>.
(Continued)

*Primary Examiner* — Martin Lerner
(74) *Attorney, Agent, or Firm* — Nicholas A. Welling (57) ABSTRACT

An approach to induction of unknown terms into a term taxonomy graph may be provided. The approach may include analyzing a domain specific corpus to generate a term taxonomy graph using a term taxonomy graph generation model with a term knowledge base and determining which terms within the domain specific corpus are out of vocabulary (OOV) terms. The approach may also analyze the terms in the domain specific corpus with a semantic representation model to generate feature vectors of the OOV terms and terms known within the generated term taxonomy graph. The approach may determine if an OOV can be a hyponym of a term within the term taxonomy graph based on the feature vectors and insert the OOV term into the graph at the appropriate location.

17 Claims, 6 Drawing Sheets

(51) Int. Cl.
G06N 20/00 (2019.01)
G06F 40/279 (2020.01)
G06F 40/30 (2020.01)
G06F 16/33 (2019.01)

(58) Field of Classification Search
USPC ............ 704/1, 9, 10; 707/777; 706/12
See application file for complete search history.

(56) References Cited

U.S. PATENT DOCUMENTS

| | | | |
|---|---|---|---|
| 2007/0106493 A1* | 5/2007 | Sanfilippo | G06F 40/30 704/9 |
| 2014/0059011 A1* | 2/2014 | Bostick | G06F 40/232 707/687 |
| 2014/0095411 A1* | 4/2014 | Lamba | G06F 40/30 706/12 |
| 2016/0085877 A1* | 3/2016 | Achyutuni | G06F 16/986 715/234 |
| 2017/0329760 A1* | 11/2017 | Rachevsky | G06F 40/247 |
| 2018/0341632 A1* | 11/2018 | Akkiraju | G06F 40/30 |
| 2020/0134058 A1* | 4/2020 | Liu | G06F 40/30 |
| 2020/0349179 A1* | 11/2020 | Kong | G06F 40/289 |
| 2020/0395001 A1* | 12/2020 | Mohanty | G06F 40/30 |
| 2021/0081500 A1* | 3/2021 | Dash | G06F 40/30 |
| 2021/0125058 A1* | 4/2021 | Chowdhury | G06F 40/247 |
| 2021/0201076 A1* | 7/2021 | Cheng | G06N 20/00 |
| 2022/0198327 A1* | 6/2022 | Wang | G06F 40/35 |

FOREIGN PATENT DOCUMENTS

| | | |
|---|---|---|
| CN | 106649819 A | 5/2017 |
| CN | 108304493 A | 7/2018 |
| CN | 108334528 A | 7/2018 |
| CN | 109684500 A | 4/2019 |
| CN | 110019648 A | 7/2019 |
| EP | 3660699 A1 * | 6/2020 |
| KR | 20160128645 A | 11/2016 |

OTHER PUBLICATIONS

Fellbaum, "A Semantic Network of English: The Mother of All WordNets," SpringerLink, Mar. 1998 [accessed on May 7, 2020], 9 pages, Retrieved from the Internet: <https://link.springer.com/article/10.1023/A:1001181927857>.

Hearst, "Automatic Acquisition of Hyponyms from Large Text Corpora," The 15th International Conference on Computational Linguistics, 1992, pp. 539-545, Retrieved from the Internet: <URL: https://www.aclweb.org/anthology/C92-2082/>.

Ibrahim, "Feedback Sequence-to—Sequence Model—Gonna Reverse Them All!," Blog, Jun. 25, 2017 [accessed on May 6, 2020], 27 pages, Retrieved from the Internet <URL: https://ahmedhanibrahim.wordpress.com/2017/06/25/feedback-sequence-to-sequence-model-gonna-reverse-them-all/>.

Lefever, "LT3: A Multi-modular Approach to Automatic Taxonomy Construction," Proceedings of the 9th International Workshop on Semantic Evaluation (SemEval 2015), Jun. 2015 pp. 944-948, Association for Computational Linguistics, Denver, CO, USA, DOI: 10.18653/v1/S15-2157, Retrieved from the Internet: <URL: https://www.aclweb.org/anthology/S15-2157>.

Li, et al., "PhraseNet: Towards Context Sensitive Lexical Semantics," CONLL '03: Proceedings of the seventh conference on Natural language learning at HLT-NAACL 2003, May 2003, pp. 87-94, vol. 4, Retrieved from the Internet: <URL: https://dl.acm.org/doi/10.3115/1119176.1119188>.

Mell, et al., "The NIST Definition of Cloud Computing", National Institute of Standards and Technology, Special Publication 800-145, Sep. 2011, 7 pages.

Miller, "WordNet: a lexical database for English," Communications of the ACM, Nov. 1995, pp. 39-41, vol. 38, No. 11, Retrieved from the Internet: <URL: https://dl.acm.org/doi/10.1145/219717.219748>.

Nguyem, et al., "Hierarchical Embeddings For Hypernymy Detection And Directionality," Proceedings of the 2017 Conference on Empirical Methods in Natural Language Processing, Sep. 7-11, 2017, pp. 233-243, Copenhagen, DK.

Panchenko, et al., "Improving Hypernymy Extraction With Distributional Semantic Classes," In Proceedings of the 11th Conference on Language Resources and Evaluation (LREC 2018), 11 pages, Miyazaki, JP, Retrieved from the Internet: <URL: https://arxiv.org/abs/1711.02918>.

Panchenko, et al., "TAXI at SemEval-2016 Task 13: a Taxonomy Induction Method based on Lexico-Syntactic Patterns, Substrings and Focused Crawling," Proceedings of the 10th International Workshop on Semantic Evaluation (SemEval-2016), Jun. 16-17, 2016, pp. 1320-1327, Retrieved from the Internet: <URL: https://www.aclweb.org/anthology/S16-1206.pdf>.

Ritter, et al., "What Is This, Anyway: Automatic Hypernym Discovery," AAAI Conference for the Advancement of Artificial Intelligence, pp. 88-93, Retrieved from the Internet: <URL: https://www.aaai.org/Papers/Symposia/Spring/2009/SS-09-07/SS09-07-015.pdf>, (2009).

Rodriguez, "Learning hypernymy in distributed word vectors via a stacked LSTM network," Stanford NLP, Jun. 4, 2016, 12 pages, Retrieved from the Internet: <URL: https://cs224d.stanford.edu/reports/Rodriguez.pdf>.

Roller, et al., "Hearst Patterns Revisited: Automatic Hypernym Detection from Large Text Corpora," Association for Computational Linguistics, 2018, pp. 358-363, Retrieved from the Internet: <URL: https://www.aclweb.org/anthology/P18-2057/>.

Shwartz, et al., "Hypernyms under Siege: Linguistically-motivated Artillery for Hypernymy Detection," ACL Home Association for Computational Linguistics, pp. 65-75, Retrieved from the Internet: <URL: https://www.aclweb.org/anthology/E17-1007.pdf>.

Snow, et al., "Learning Syntactic Patterns for Automatic Hypernym Discovery," Advances in Neural Information Processing Systems, Nov. 2004 [accessed on May 12, 2020], 23 pages, Retrieved from the Internet: <URL: https://www.researchgate.net/publication/221618883_Learning_Syntactic_Patterns_for_Automatic_Hypernym_Discovery>.

Tsujimura, et al., "TTI-COIN at SemEval-2017 TasK 10: Investigating Embeddings for End-to-End Relation Extraction from Scientific Papers," Proceedings of the 11th International Workshop on Semantic Evaluation (SemEval-2017), Jan. 2017, pp. 985-989, DOI: 10.18653/v1/S17-2172.

Ustalov, "Unsupervised Sense-Aware Hypernymy Extraction," Proceedings of the 14th Conference on Natural Language Processing, Sep. 19-21, 2018, pp. 192-201, Vienna, AT.

Zhang, et al., "SJTU-NLP at SemEval-2018 Task 9: Neural Hypernym Discovery with Term Embeddings," Proceedings of the 12th International Workshop on Semantic Evaluation (SemEval-2018), Jun. 5-6, 2018, pp. 903-908, 2018 Association for Computational Linguistic, New Orleans, LA, USA, Retrieved from the Internet: <URL: https://www.aclweb.org/anthology/S18-1147.pdf>.

Le et al., "Inferring Concept Hierarchies from Text Corpora via Hyperbolic Embeddings", arXiv:1902.00913v1 [cs.CL] Feb. 3, 2019, 11 pages.

Nguyen, et al., "Hierarchical Embeddings For Hypernymy Detection And Directionality," Proceedings of the 2017 Conference on Empirical Methods in Natural Language Processing, Sep. 7-11, 2017, pp. 233-243, Copenhagen, DK.

Tsujimura, et al., "TTI-COIN at SemEval-2017 Task 10: Investigating Embeddings for End-to-End Relation Extraction from Scientific Papers," Proceedings of the 11th International Workshop on Semantic Evaluation (SemEval-2017), pp. 985-989, Vancouver, Canada, Aug. 3-4, 2017, Conference Paper Jan. 2017, DOI: 10.18653/v1/S17-2172.

* cited by examiner

TAXONOMY GENERATION TO INSERT OUT OF VOCABULARY TERMS AND HYPERNYM-HYPONYM PAIR INDUCTION

BACKGROUND OF THE INVENTION

The present invention relates generally to modeling hypernyms and more specifically, to hypernym-hyponym pair induction into a taxonomy graph of terms using data augmentation techniques.

Natural language processing allows for greater interaction between humans and computers. Underlying taxonomies in knowledge bases improve the interaction between humans and computers. Many words and multi-word expressions have multiple meanings, which may fall into different categories. Intelligent term detection systems can detect when terms are related and can place the related terms into a term taxonomy graph.

Term taxonomy graphs are of tremendous value in Natural Language Processing systems. Domain specific term taxonomy graphs allow for optimized search engine results and assisting users in developing search queries by providing more general or specific terms related to the desired search subject. Further, virtual assistants require term taxonomy graphs to improve responses to commands from users.

SUMMARY

Embodiments of the present disclosure include a computer-implemented method, computer program product, and a system for extracting a plurality of terms from a domain specific corpus. A processor can generate a term taxonomy graph from a plurality of terms. The processor can determine if there is at least one out of vocabulary (OOV) term from the plurality of terms. Responsive to determining there is at least one OOV term, a processor can analyze the terms within the term taxonomy graph and analyze the OOV term to determine if there is a similarity between a term within the term taxonomy graph and the OOV term above a threshold. Responsive to determining if there is a similarity above the threshold, a processor inserts the OOV term into the term taxonomy graph as a branch from the term within the term taxonomy graph.

The above summary is not intended to describe each illustrated embodiment of every implementation of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted and described herein recognize the benefits of induction of hypernym-hyponym pairs detected from a domain specific corpus and inducted into a pre-existing term taxonomy graph. Further, induction of the hypernym-hyponym pairs can be accomplished using weak-supervised machine learning models. It should be noted throughout this specification the terms "word" and "terms" are used interchangeably and should be afforded the same meaning.

In an embodiment of the present invention, a hypernym-hyponym induction engine (HHIE) can receive a domain-specific corpus, analyze the domain specific corpus and extract terms from the domain-specific corpus. The HHIE can automatically identify hypernym-hyponym pairs (HHPs) from the extracted terms and can build a term taxonomy graph from its knowledge bases. The HHIE can compare the extracted terms to the terms within the term taxonomy graph to determine if any of the terms are an out-of-vocabulary (OOV) term. An OOV term is a term that is not inside the taxonomy graph but can be found inside the corpus. If the HHIE determines a term within the domain specific corpus is an OOV term, the HHIE can analyze the known terms within the term taxonomy graph and can determine a hypernym for the OOV term based on analyzing the similarities between the OOV term and the hypernym to identify HHP candidates. Based on the similarity analysis, the OOV term can be inserted into the term taxonym graph at an appropriate location.

In some embodiments, HHIE may include a neural network capable of determining the similarity of the words extracted from the domain specific corpus. Non limiting examples of neural networks that embodiments may include are multilayer perceptron, convolutional neural network, recurrent neural network (long short-term memory neural network) and feed forward neural network. The neural networks may be weak-supervised models with reward functions capable of reinforcement learning (e.g. backpropagation including gradient descent).

Further, in some embodiments, HHIE can include a gold taxonomy list of terms from a third-party source to augment the knowledge base of the HHIE and assist in identifying term similarities and inserting OOV terms into the term taxonomy graph. A gold taxonomy list is a human annotated list of hypernymy pairs, and/or a list of hypernym pairs from a third-party database.

Additionally, in some embodiments the hypernym determined to be similar to the OOV in the term taxonomy graph can be analyzed to determine if it is a true hypernym. A true hypernym is a hypernym in a hypernym pair which has a number of hyponyms, within the known term list, above a given threshold. A true hyponym becomes a root of a subgraph, with OOVs forming further branches from the true hyponym.

In another aspect of some embodiments, if a hypernym is determined to be a true hypernym, the similarity between the terms in the HHP can be analyzed. If the similarity in the HHP is determined to be above a threshold, the HHP may be relocated within the term taxonomy graph at a higher taxonomy location.

In another embodiment, the HHP can be assigned a label within a classification model. The classification model can learn the semantic representation (such as word embeddings) of the HHP and calculate one or more of the following features: the similarities between the terms in the HHP, the number of previous hyponyms in the hypernym in the HHP, the averaged similarities between the hyponyms in the HHP and previously known hyponyms for the hypernym in the HHP, and the average similarity of the neighboring terms of the hypernym in the HHP.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
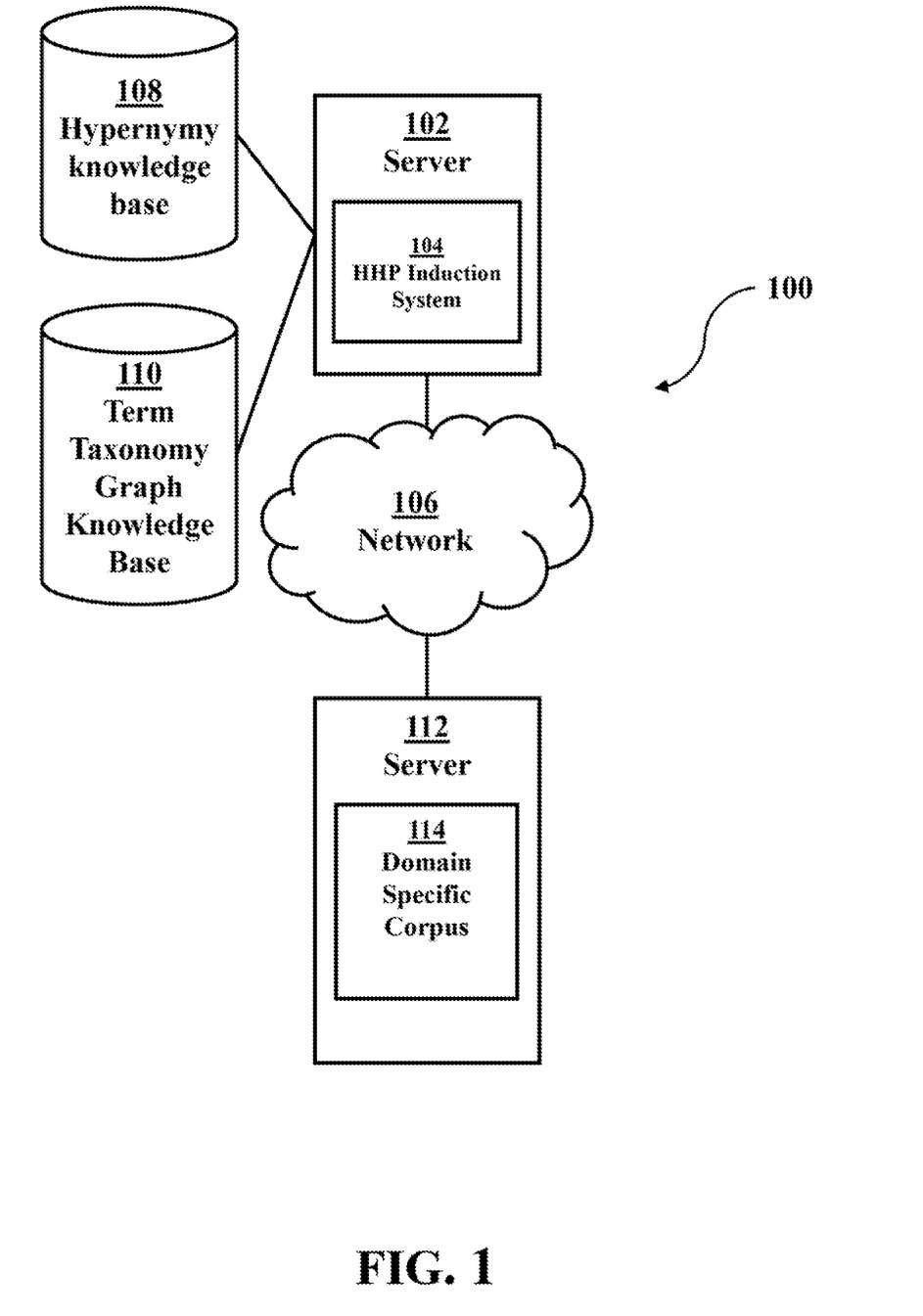
FIG. 1 is a functional block diagram generally depicting an environment for hypernym-hyponym pair induction, in accordance with an embodiment of the present invention.

FIG. 1 is a functional block diagram depicting, generally, an environment for HHP induction 100. The environment for HHP induction 100 comprises an HHP induction engine 104 operational on a server 102, hypernymy knowledge base 108 and term taxonomy graph knowledge base (TTGKB) 110 stored on server 102, domain specific corpus 114 operational on server 112, and network 106 supporting communications between the server 102 and the server 112.

Servers 102 and 112 can be a standalone computing device, a management server, a web server, a mobile computing device, or any other electronic device or computing system capable of receiving, sending, and processing data. In other embodiments, servers 102 and 112 can represent a server computing system utilizing multiple computers as a server system. In another embodiment, servers 102 and 112 can be a laptop computer, a tablet computer, a netbook computer, a personal computer, a desktop computer, or any programmable electronic device capable of communicating with other computing devices (not shown) within an environment for hypernym-hyponym pair induction 100 via network 106.

In another embodiment, servers 102 and 112 represent a computing system utilizing clustered computers and components (e.g., database server computers, application server computers, etc.) that can act as a single pool of seamless resources when accessed within an environment for hypernym-hyponym pair induction 100. Servers 102 and 112 can include internal and external hardware components, as depicted and described in further detail with respect to FIG. 4.

HHP induction engine 104 can be a module for receiving domain specific corpus terms, extracting HHPs from a domain specific terms corpus, classifying an HHP, analyzing a term taxonomy graph, and augmenting a term taxonomy graph with the HHPs. It should be noted, while shown in FIG. 1 operational on only one computing device, in some embodiments HHP induction engine 104 may be operational on one or more computing devices or within a cloud computing system. HHP induction system may perform some actions described above on different computing systems simultaneously or in sequence. In other embodiments, HHP induction engine 104 may analyze two or more domain specific terms corpora simultaneously and perform multiple functions, as described above, simultaneously. It should be noted, in some embodiments HHP induction engine 104 can include an optical character recognition (OCR) capability allowing for extraction terms from unstructured data including scanned documents, images and captured video data for HHP induction.

Network 106 can be, for example, a local area network (LAN), a wide area network (WAN) such as the Internet, or a combination of the two, and can include wired, wireless, or fiber optic connections. In general, network 106 can be any combination of connections and protocols that will support communications between servers 102 and 112.

Hypernymy Knowledge base 108 can be a database that contains semantic data related to terms within a term taxonomy graph. The data can be previously calculated and/or categorized by human annotation, machine learning models or a combination of human annotation, machine learning models, and computational models. Information associated with semantic data may include semantic relationships, definitions, synonyms, term origin language information, and contextual information. Additionally, semantic data can include information associated with the similarities of words, term sentiment, intent detection, parts of speech, syntactic relationships, and semantic relationships. Semantic data may include translations to other languages and associations with geographic pronunciations and slang. Further, semantic data may contain domain specific information, for example, medical subjects, musical subjects.

TTGKB 110 can be a database that contains term taxonomy graphs and domain specific taxonomy graph data. A term taxonomy graph can be a network graph which contains words as nodes and vectors connecting the nodes. Further, a term taxonomy graph is a way to visualize and store words in hypernymy relationships where, more general terms form roots and more descriptive terms branch off from the roots. TTGKB 110 can contain one or more term taxonomy graphs and can contain multiple domain specific term taxonomy graphs and domain specific corpus. A domain may be a specific subject (e.g., medical, music, financial, scientific, politics, sports, etc.) or it may be a semantic relationship classification for terms in specific geographies (e.g., Australia, United Kingdom, Western United States, Canada). It should be noted TTGKB 110 and hypernymy knowledge base 108 may be combined in the same database or over multiple databases.

Domain specific corpus 114 can be a sample of text from which terms can be extracted. Domain specific corpus 114 can be structured data from a database (e.g., human annotated list of terms including HHP relationships). Domain specific corpus 114 can also be unstructured data (e.g. web pages, news articles, books, magazine articles, closed captioning scripts, images, video data). It should be noted, while domain specific corpus is shown on server 112, domain specific corpus 114 may be located on multiple systems or may be present on computing devices with HHP induction engine 104. Domain specific corpus 114 can be located on any device which can communicative over network 106 wherein a device or devices HHP induction system is operational.

Figure 2:
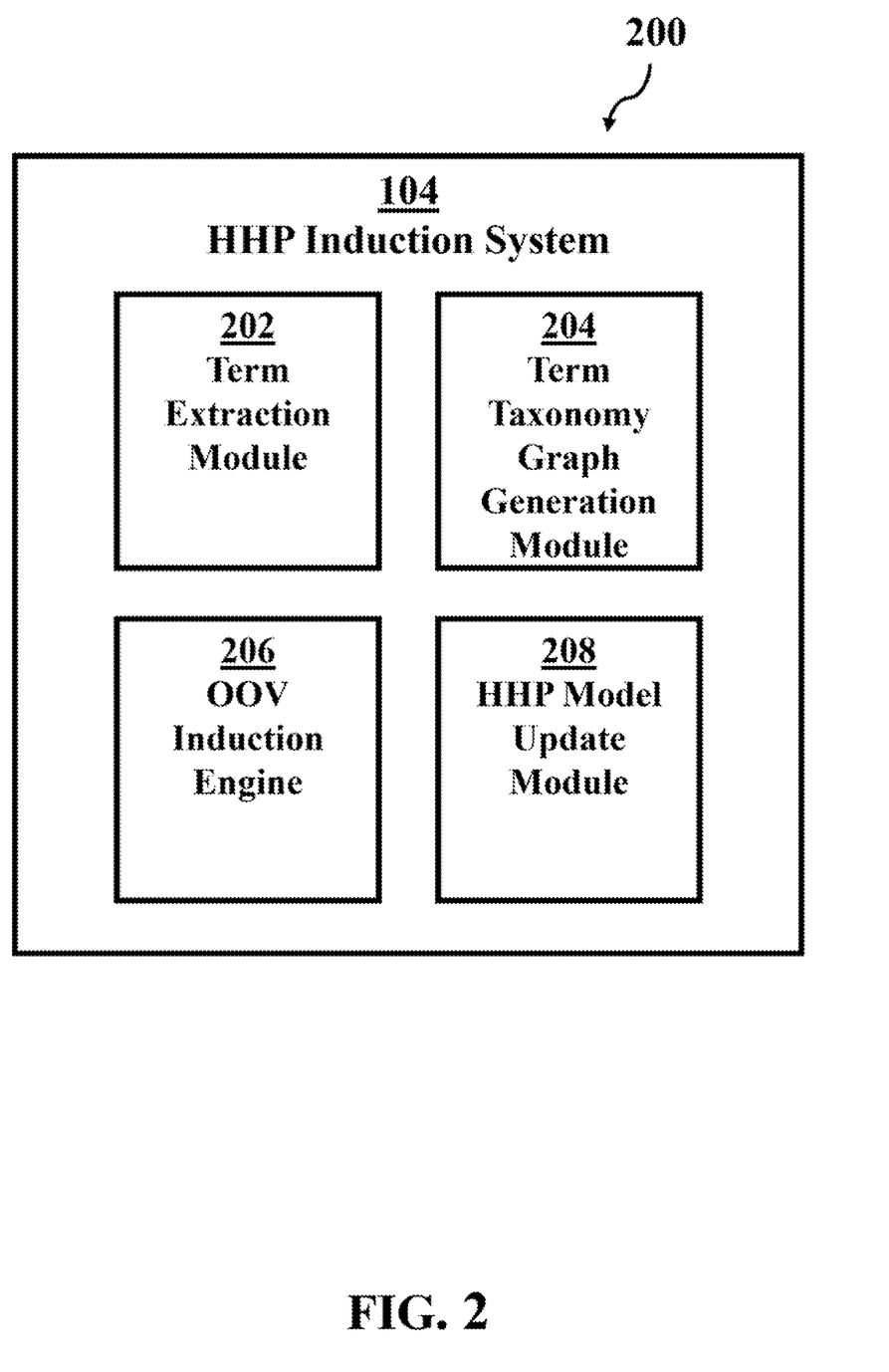
FIG. 2 is a functional block diagram depicting a hypernym-hyponym pair induction engine, in accordance with an embodiment of the present invention.

FIG. 2 is a functional block diagram 200 depicting HHP induction engine 104 comprising term extraction module 202, term taxonomy graph generation module 204, OOV induction engine 206, and HHP model update module 208. It should be noted that the capabilities of items comprised by HHP induction engine 104 are not exclusive and in other embodiments of the present invention, may be performed by the other components within the HHP induction engine 104.

Term extraction module 202 can be configured to analyze a domain specific corpus 114, in accordance with embodiments of the present disclosure. In some embodiments, a user can submit a domain specific corpus 114 to term extraction module 202 to be analyzed. Term extraction module 202 can have natural language processing capabilities to aide in the extraction and identification of HHPs from a domain specific corpus 114. The natural language processing capabilities may be aided by hypernymy knowledge base 108.

In some embodiments, term extraction module 202 can tokenize a domain specific corpus 114. It should be noted that tokenization can include converting a sequence of text characters into a sequence of tokens. A token may be a string of characters from a domain specific corpus 114, categorized as a meaningful symbol. Further, tokenization can include identifying term boundaries and breaking text into component elements, such as, but not limited to, words, multiword tokens, numbers, and punctuation marks. In some embodiments, tokenization can include identifying lexemes within text and categorizing the lexemes into tokens. Tokenization may remove words that are repeating from the extracted terms. Further, tokenization may remove specific words from a vocabulary that may impede HHP induction (e.g., the, of, and, to).

Additionally, in some embodiments, term extraction module 202 can provide part-of-speech tagging capabilities. Part-of-speech tagging marks a term with the corresponding part-of-speech (e.g. nouns, pronouns, verbs, adverbs, adjectives, prepositions, conjunctions, interjections, articles). The part-of-speech of a term may be based on the definition of a word and the context of the word. Context of the word is the meaning of the word in relation to the words within a window surrounding it. Examples of window size can include one word before the target word, one word after the target word, two words before the target word, two words after the target word, three words before the target word, three words after the target word, or a combination of the aforementioned examples.

In some embodiments, term extraction module 202 may also provide a semantic relationship analysis of the terms of the domain specific corpus 114. Semantic relationship analysis can be a determination of the meaning of a term based on its context. The context of a word is determined by the words surrounding it and the definition of the word. Examples of semantic relationship analysis include training and exploiting semantic representation models such as word-embeddings (e.g., word2vec, GloVe, Continuous Bag-of-Words, Continuous Skip-Gram, etc.), topic models (e.g. latent semantic analysis (LSA), Latent Dirichlet allocation (LDA), etc), etc. Semantic relationship analysis can also identify the similarities between words using a vector analysis generated by the semantic representation model.

In some embodiments, term extraction module 202 can determine if terms from the domain specific corpus 114 are HHPs. This determination can occur if the terms within the HHPs are already known within hypernymy knowledge base 108. Additionally, HHPs can be determined if the similarities between terms are above a predefined threshold or a dynamically set threshold (e.g. the threshold can change based on a proportion of similar terms identified within the domain specific corpus).

Term taxonomy graph generation module 204 can take the terms extracted by term extraction module 202 and generate a term taxonomy graph from the HHPs. The HHPs are organized in a term taxonomy graph based on known HHPs from the term taxonomy graph knowledge base 110 and HHPs that are identified by HHP extraction module 204. Term Taxonomy graph generation module 204 can determine true hypernyms from the extracted terms. A true hypernym is a hypernym candidate which has a number of hyponyms above a threshold. There can be multiple thresholds, indicating the hypernym candidate will be higher in the term taxonomy graph. True hypernyms form the root nodes from which hyponyms can be attached.

OOV induction engine 206 can analyze the terms extracted from domain specific corpus 114 by term extraction module 202. Further, OOV induction engine 206 can compare the extracted terms to the terms within the term taxonomy graph generated by term taxonomy graph generation module 204. Extracted terms that are not found within the generated term taxonomy graph are labeled OOV terms. OOV induction engine 206, can compare hypernym candidates within the term taxonomy graph to OOV terms and can determine if there is a similarity (e.g. vectors associated with word embeddings) above a threshold. If the threshold is met, the hypernym and OOV are considered an HHP. OOV induction engine 206 can compare the similarity (e.g. vectors associated with word embeddings) of all hyponyms previously associated with the hypernym. In some embodiments, OOV induction engine 206 can determine the average similarity hyponyms for the hypernym, by calculating similarity of the top K neighbors for the hypernym and generating the dot product of the vectors.

Further, in some embodiments, OOV induction engine 206 can have a classification model which determines if an HHP relationship is present. OOV induction engine 206 can compare all the OOV terms to the hypernyms within the graph and determine if the "is-a" relationship exists by calculating features associated with the relationship. For example, the similarities between hyponym and hypernym, the number of previous hyponyms for the hypernym, the averaged similarity of the previously associated hyponyms, and the averaged similarity of the top K neighbors for the hypernym.

OOV induction engine 206 also provides the capability to divide the OOVs into batches and compare the OOVs to hypernyms within a localized subgraph. The batches can be OOV terms with similarities of a certain type (e.g. embeddings have similar vectors). A localized subgraph can be a portion of the term taxonomy graph which can be identified by OOV induction engine 206 to have a similarities relationship to the OOV batch through a semantic representation analysis. OOV induction engine 206 can populate the subgraph with the OOVs in the batch until the batch is exhausted.

HHP model update module 208 can insert the HHP pair into the term taxonomy graph if it is determined the similarity between the OOV and candidate hypernym is above a threshold. HHP model update module 208 also provides the capability to attach the OOV to the candidate hypernym node within the term taxonomy graph. Further, HHP model update module 208 can update hypernymy knowledge base 108 with the information generated by OOV induction engine 206. Further, HHP model update module 208 can relocate terms within the term taxonomy graph if it is determined an OOV has been inserted higher in the taxonomy in a previous insertion.

Figure 3:
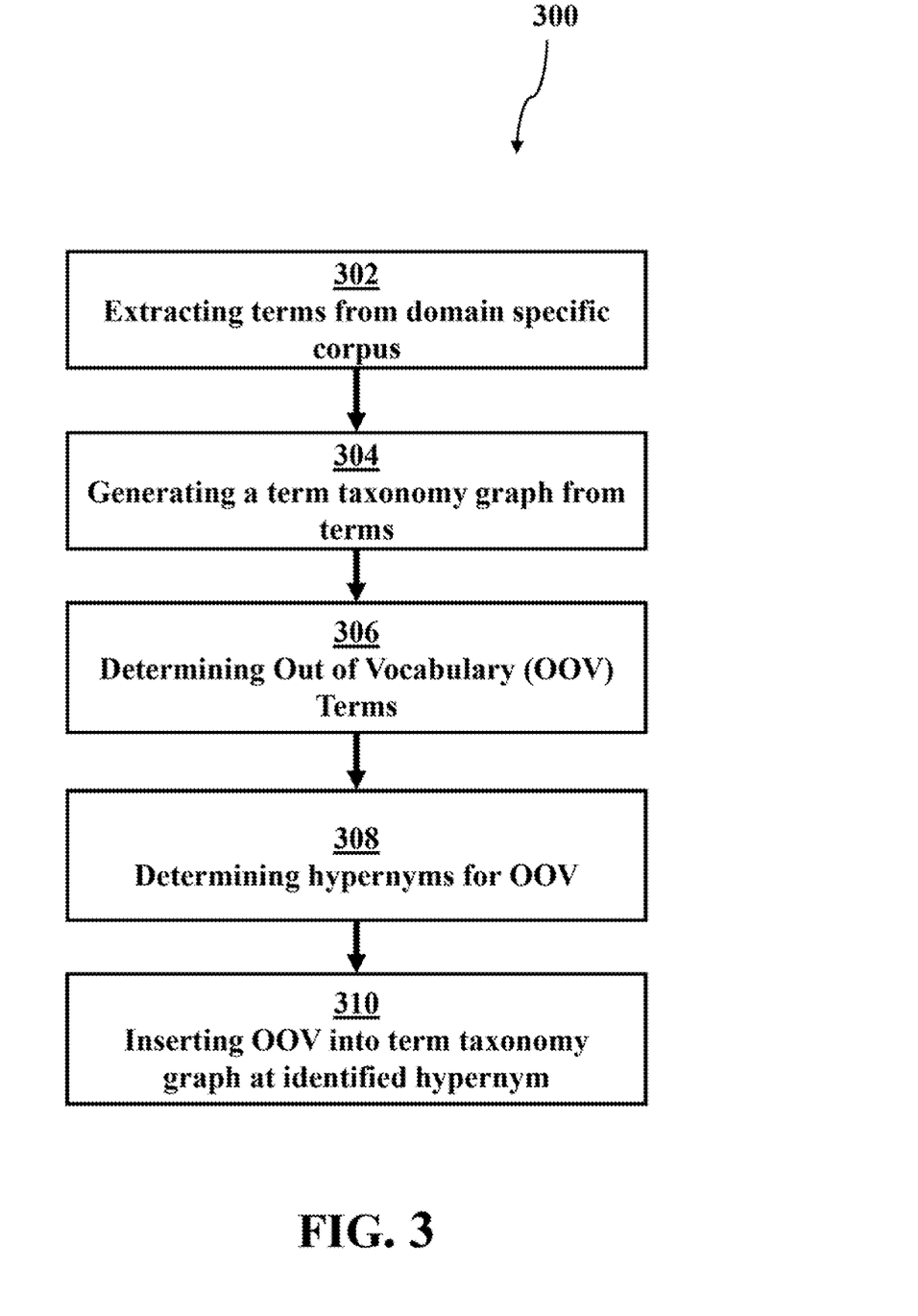
FIG. 3 is a flowchart depicting operational steps of a method for hypernym-hyponym induction into an existing term taxonomy graph, in accordance with an embodiment of the present invention.

FIG. 3 is a flowchart depicting operational steps of a method for hypernym-hyponym pair induction into a domain specific term taxonomy graph. At step 302, terms can be extracted from a domain specific corpus by term extraction module 202. At step 304, a term taxonomy graph can be generated by term taxonomy graph generation module 204. This task can be accomplished using the terms extracted by term extraction module 202 and aided by term taxonomy graph knowledge base 110. At step 306, OOV induction engine 206 can determine the OOV terms by comparing the extracted terms against the generated term taxonomy graph. At step 308, OOV induction engine 206 can determine a hypernym for an OOV term by determining the similarity between the OOV terms and the terms within the term taxonomy graph. At step 310, the OOV terms can be inserted into the term taxonomy graph by HHP model update module 208 as a hyponym of a hypernym that has been determined to have the aforementioned similarity by OOV induction engine 206.

Figure 4:
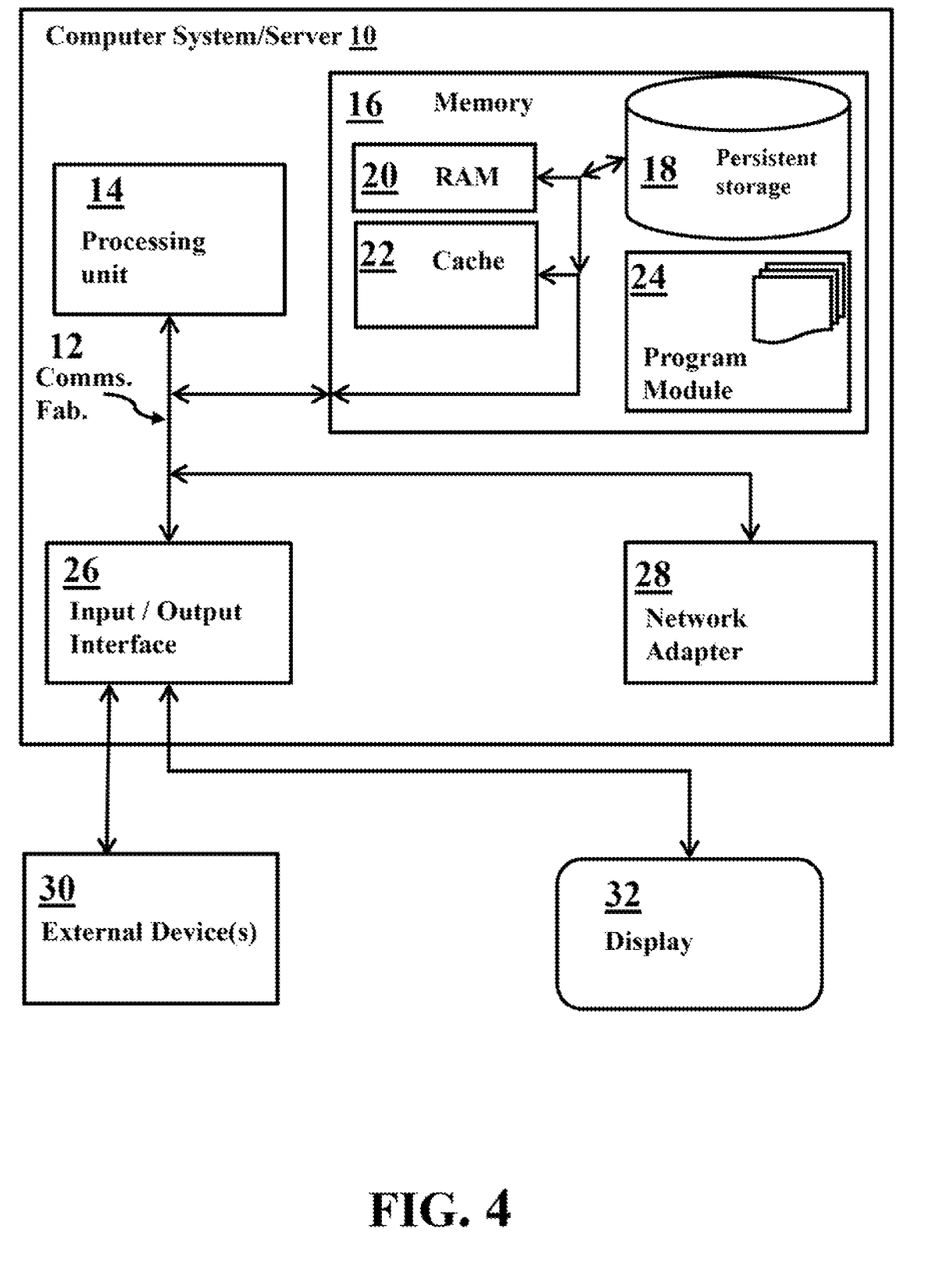
FIG. 4 is a functional block diagram of an exemplary computing system within an environment for hypernym-hyponym pair induction, in accordance with an embodiment of the present invention.

FIG. 4 depicts computer system 10, an example computer system representative of a dynamically switching user interface computer 10. Computer system 10 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Computer system 10 includes processors 14, cache 22, memory 16, persistent storage 18, network adaptor 28, input/output (I/O) interface(s) 26 and communications fabric 12. Communications fabric 12 provides communications between cache 22, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes random access memory (RAM). In general, memory 16 can include any suitable volatile or non-volatile computer readable storage media. Cache 22 is a fast memory that enhances the performance of processors 14 by holding recently accessed data, and data near recently accessed data, from memory 16.

Program instructions and data used to practice embodiments of the present invention may be stored in persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

PO interface(s) 26 allows for input and output of data with other devices that may be connected to each computer system. For example, I/O interface 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
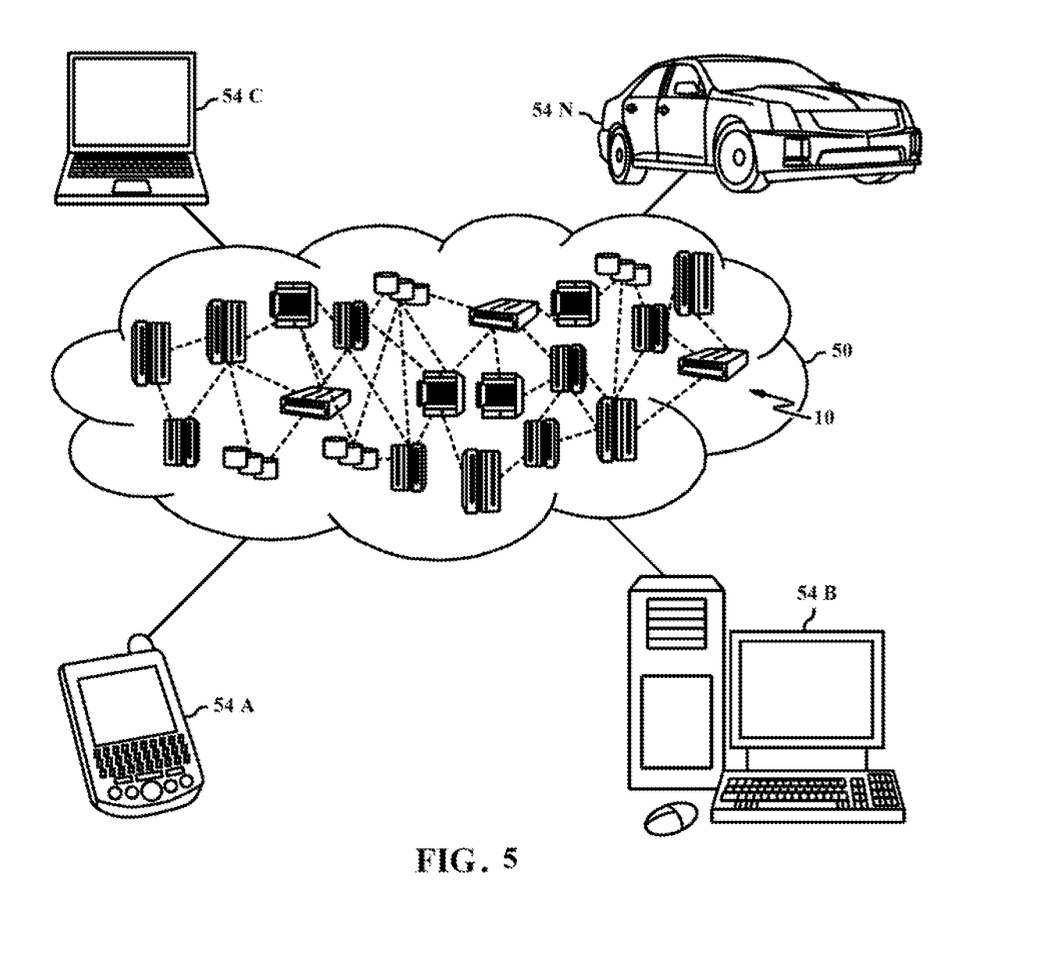
FIG. 5 is a diagram depicting a cloud computing environment, in accordance with an embodiment of the present invention.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
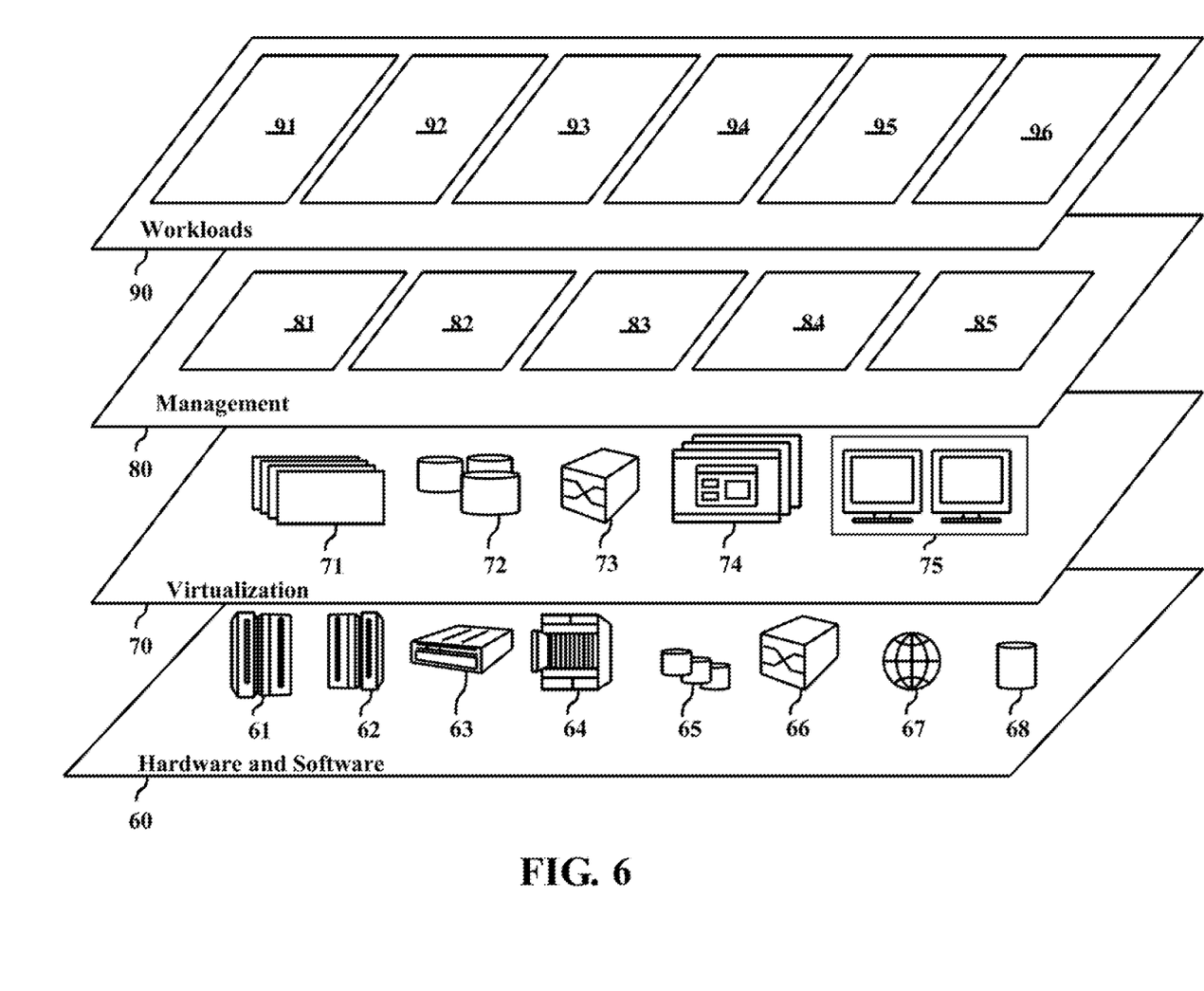
FIG. 6 is a functional block diagram depicting abstraction model layers, in accordance with an embodiment of the present invention.

FIG. 6 is a block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and HHP induction 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for hypernym-hyponym pair induction into a term taxonomy graph, the computer-implemented method comprising:
    extracting, by one or more processors, a plurality of terms from a domain specific corpus;
    generating, by the one or more processors, a term taxonomy graph from the plurality terms, wherein generating the term taxonomy graph is based, at least in part, on a pre-existing weak-supervised hypernym induction model with a term-taxonomy graph knowledge base;
    determining, by the one or more processors, if there is at least one out-of-vocabulary (OOV) term from the plurality of terms;
    responsive to determining there is at least one OOV term, analyzing, by the one or more processors, the plurality of terms within the term taxonomy graph and the at least one OOV term to determine if there is a similarity between at least one term within the term taxonomy graph and the at least one OOV term above a threshold; and
    responsive to determining there is a similarity above the threshold, inserting, by the one or more processors, the at least one OOV term into the term taxonomy graph as a branch from the at least one term within the term taxonomy graph.

2. The computer-implemented method of claim 1, wherein the determining there is at least one OOV term comprises, comparing, by the one or more processors, the plurality of extracted terms from the domain specific corpus to the terms within the generated term taxonomy graph to determine if there are any terms within the plurality of extracted terms that are not within the term taxonomy graph.

3. The computer-implemented method of claim 1, further comprising:
    augmenting, by the one or more processors, the terms within the term taxonomy graph with a third-party list of annotated hypernym-hyponym pairs; and
    inserting, by the one or more processors, the augmented terms into the term taxonomy graph.

4. The computer-implemented method of claim 1, wherein comparing the similarity between the OOV and the terms in the term taxonomy graph comprises: generating, by the one or more processors, word vectors for the OOV and the terms using a semantic representation model; and comparing the vectors between the OOV and the terms in the term taxonomy graph.

5. The computer-implemented method of claim 1, further comprising:
    updating, by the one or more processors, the weak-supervised hypernym induction model to reflect the inserted OOV.

6. The computer-implemented method of claim 1, further comprising:
    repeating, by one or more processors, the steps until all OOVs have been inserted into the term taxonomy graph or the remaining OOVs cannot obtain a similarity to any terms within the term taxonomy graph above a threshold.

7. A computer system for hypernym-hyponym pair induction into a term taxonomy graph, the system comprising:
    one or more computer processors;
    one or more computer readable storage media;
    computer program instructions;
    extract a plurality of terms from a domain specific corpus;
    generate a term taxonomy graph from the plurality terms, wherein generating the term taxonomy graph is based, at least in part, on a pre-existing weak-supervised hypernym induction model with a term-taxonomy graph knowledge base;
    determine if there is at least one out of vocabulary term OOV from the plurality of terms;
    responsive to determining there is at least one OOV term, analyze the terms within the term taxonomy graph and analyzing the OOV term to determine if there is a similarity between a term within the term taxonomy graph and the OOV term above a threshold; and
    responsive to determining if there is a similarity above the threshold, insert the OOV term into the term taxonomy graph as a branch from the term within the term taxonomy graph.

8. The computer system of claim 7, wherein determining there is at least one out of vocabulary term comprises, compare the plurality of extracted terms from the domain specific corpus to the terms within the generated term taxonomy graph to determine if there are any terms within the extracted terms that are not within the term taxonomy graph.

9. The computer system of claim 7, further comprising:
    augment the terms within the term taxonomy graph with a third-party list of annotated hypernym-hyponym pairs; and
    insert the augmented terms into the term taxonomy graph.

10. The computer system of claim 7, wherein the comparing the similarity between the OOV and the terms in the term taxonomy graph comprises: generate word vectors for the OOV and the terms using a semantic representation model; and
    compare the vectors between the OOV and the terms in the term taxonomy graph.

11. The computer system of claim 7, further comprising:
    updating the weak-supervised hypernym induction model to reflect the inserted OOV.

12. The computer system of claim 7, wherein:
    repeating the steps until all OOVs have been inserted into the term taxonomy graph or when comparing, if the remaining OOVs cannot obtain a similarity to any terms within the term taxonomy graph above a threshold.

13. A computer program product for hypernym-hyponym pair induction into a term taxonomy graph, the computer program product comprising one or more computer readable storage media and program instructions sorted on the one or more computer readable storage media, the program instructions including instructions to:
    extract a plurality of terms from a domain specific corpus;
    generate a term taxonomy graph from the plurality terms, wherein generating the term taxonomy graph is based, at least in part, on a pre-existing weak-supervised hypernym induction model with a term-taxonomy graph knowledge base;

determine if there is at least one out of vocabulary term OOV from the plurality of terms;

responsive to determining there is at least one OOV term, analyze the terms within the term taxonomy graph and analyzing the OOV term to determine if there is a similarity between a term within the term taxonomy graph and the OOV term above a threshold; and responsive to determining if there is a similarity above the threshold, insert the OOV term into the term taxonomy graph as a branch from the term within the term taxonomy graph.

14. The computer program product of claim 13, wherein determining there is at least one out of vocabulary term comprises, compare the plurality of extracted terms from the domain specific corpus to the terms within the generated term taxonomy graph to determine if there are any terms within the extracted terms that are not within the term taxonomy graph.

15. The computer program product of claim 13, further comprising:

augment the terms within the term taxonomy graph with a third-party list of annotated hypernym-hyponym pairs; and insert the augmented terms into the term taxonomy graph.

16. The computer program product of claim 13, further comprising:

updating the weak-supervised hypernym induction model to reflect the inserted OOV.

17. The computer program product of claim 13, wherein the comparing the similarity between the OOV and the terms in the term taxonomy graph comprises: generate word vectors for the OOV and the terms using a semantic representation model; and compare the vectors between the OOV and the terms in the term taxonomy graph.

\* \* \* \* \*